United States Patent
Harada

[19]

[11] Patent Number: 6,061,003
[45] Date of Patent: May 9, 2000

[54] MAP ACQUISITION SYSTEM, MAP ACQUISITION UNIT, AND NAVIGATION APPARATUS EQUIPPED WITH A MAP ACQUISITION UNIT

[75] Inventor: Tomoyasu Harada, Susono, Japan

[73] Assignee: Toyota Jidosha Kabushiki Kaisha, Aichi-Ken, Japan

[21] Appl. No.: 09/115,227

[22] Filed: Jul. 14, 1998

[30] Foreign Application Priority Data

Jul. 27, 1997 [JP] Japan ..................................... 9-192429

[51] Int. Cl.⁷ ................................................. G08G 1/123
[52] U.S. Cl. .......................... 340/995; 340/990; 701/208; 701/212
[58] Field of Search ................................... 340/995, 990, 340/988; 701/208, 209, 211, 212

[56] References Cited

U.S. PATENT DOCUMENTS

| | | | |
|---|---|---|---|
| 4,675,676 | 6/1987 | Takanabe et al. | 340/995 |
| 4,819,174 | 4/1989 | Furuno et al. | 340/995 |
| 5,315,298 | 5/1994 | Morita | 340/995 |
| 5,471,205 | 11/1995 | Izawa | 340/995 |
| 5,543,789 | 8/1996 | Behr et al. | 340/990 |
| 5,680,312 | 10/1997 | Oshizawa et al. | |
| 5,850,618 | 12/1998 | Suetsugu et al. | 701/212 |

FOREIGN PATENT DOCUMENTS 8-285613  11/1996  Japan .

*Primary Examiner*—Brent Swarthout
*Attorney, Agent, or Firm*—Finnegan, Henderson, Farabow, Garrett & Dunner, L.L.P.

[57] ABSTRACT

A vehicle-mounted map acquisition apparatus 1 obtains maps A–D of different scales from a information center 30. Map A with a small scale covering a wide area is obtained at a starting point distant from a destination and is used to provide route guidance. As a vehicle approaches the destination, it reaches a map acquisition point where map B with a larger scale is obtained. As the vehicle further approaches the destination, a map with a still larger scale is obtained. Map data with a scale suitable for each place along the way to the destination is obtained. As a large amount of data is not sent at once, sufficient map data can be obtained with a limited communication capability and a small capacity memory.

4 Claims, 8 Drawing Sheets

EXAMPLE OF GUIDANCE TO EACH SUBGOAL AND
MAP DATA HELD IN VEHICLE-MOUNTED APPARATUS

MAP ACQUISITION SYSTEM, MAP ACQUISITION UNIT, AND NAVIGATION APPARATUS EQUIPPED WITH A MAP ACQUISITION UNIT

BACKGROUND OF THE INVENTION

1. Field of the Invention

This invention relates to a map acquisition system including a center unit and a map acquisition unit in a vehicle which are connected via a communication medium. In this system, the map acquisition unit obtains from the center unit map data suitable for navigation. This invention also relates to a navigation apparatus having a medium for obtaining map data from the center unit.

2. Description of the Related Art

A vehicle-mounted navigation apparatus is one known electronic device using map data. Such an apparatus displays on its display a map covering places around the present position and lets the driver know, with map data, which route to the destination to take. Commonly, a storage medium, such as a CD-ROM with recorded map data, is mounted on a navigation apparatus. In such a case, map data read out from a storage medium is used to provide, for example, route guidance.

On the other hand, it has been suggested that a map acquisition unit be installed in a navigation apparatus and that the map acquisition unit obtain map data from the outside. Such a map acquisition unit and a center unit are connected via a communication medium and comprise a map acquisition system. The center unit holds map data; the map acquisition unit obtains from the center unit maps necessary for navigation to the destination. This system has the advantage of being able to use detailed maps which cannot completely be stored on a storage medium such as a CD-ROM. It also has the advantage of being able to quickly respond to the update of maps because all that is necessary to change data for the new data to be sent. Furthermore, the cost of a map storage medium and related configurations can be reduced.

According to Japanese Patent Laid-Open Publication No. Hei8-285613, a portable terminal obtains map data from a center unit via a communication line. This portable terminal is carried by the user and sends the center unit information about the position of a starting point and a destination. The center unit sets a route to the destination and sends the portable terminal a map covering a calculated route.

Because a map acquisition system has limited communication capability, the number of maps obtained at one time should be minimized. In terms of transfer rate and transmission quality, it is difficult to send a large number of maps at one time and memory for holding map data requires a greater capacity for large amounts of data. However, no known art can effectively deal with the above needs.

In a system according to the above publication, for example, a number of maps adjacent to one another along a calculated route are sent. These maps are drawn to the same scale and are similar size. The amount of map data, therefore, increases in proportion to the distance to a destination. A distant destination will lead to a vast amount of data, which increases communication time. Also, processes using map data cannot be started before the communication has been completed. A larger amount of map data also requires a larger amount of memory in a vehicle. To avoid these problems, the above group of maps with the same scale and size can be obtained in parts. It is difficult, however, to perform user-friendly navigation with maps showing only part of a calculated route.

As stated above, furthermore, the cost of storage medium, such as a CD-ROM, and related configurations can be reduced by installing a map acquisition unit, which may lead to a low-cost navigation apparatus. In systems which have been suggested, including that according to the above publication, it is, however, assumed that a center unit sets a route to a destination. Because map data for route guidance is not provided in a vehicle. The center unit must perform the calculation of a route for each of many vehicles, which is a heavy burden on the center unit. To reduce this burden, a vehicle can obtain map data used by the center unit for route calculation. This will, however, increase the amount of data that must be sent, causing communication capability problems. Therefore, a vehicle should be able to calculate a route by receiving a proper amount of data.

SUMMARY OF THE INVENTION

It is an object of the present invention to provide a map acquisition system which can properly obtain useful map data at each point on the way to a destination so that a sufficient amount of map data can be obtained with limited communication capability and a limited amount of memory capacity in a vehicle.

It is another object of the present invention to provide a map acquisition unit in a vehicle which is applied to such a map acquisition system.

It is still another object of the present invention to provide a navigation apparatus which is equipped with an improved map acquisition unit and enables proper vehicle routing.

(1) In a map acquisition system according to the present invention, a center unit and a map acquisition unit in a vehicle are connected via a communication medium and the map acquisition unit obtains from the center unit map data covering areas to a travel destination. This system comprises center-side map storage means installed in the center unit and storing map data with different scales, present-position detecting means for detecting the present position of the vehicle, destination setting means for setting a travel destination of the vehicle, and deciding means for deciding, based on the present position, whether the vehicle has reached a map acquisition place set for each scale of the above map data. A map acquisition place where larger scale map data is obtained is set nearer to the destination so that the scale of map data obtained at a map acquisition place balances with the distance between this place and the destination. Based on a decision of the deciding means, the center unit sends the map acquisition unit map data with a scale corresponding to a place where the vehicle has reached.

According to the present invention, the center-side map storage means stores map data with different scales. The map acquisition unit in a vehicle obtains map data with each scale. It is preferable that this data should include a destination. According to the setting of the above map acquisition places, small scale rough map data is obtained at a place distant from a destination; large scale detailed map data is obtained at a place near to a destination. With navigation, a rough map covering a wide area, or a small scale map is useful at points distant from a destination, while a detailed map covering a limited area, a large scale map, is useful at a place near to a destination. According to the present invention, therefore, map data obtained at each map acquisition place is suitable for the place and useful. Map data is sent in parts, so that the amount of data to be sent is reduced and communication can be performed smoothly. In a vehicle the capacity of a memory for holding map data can be reduced because old maps can be deleted after newly obtained ones begin to be used.

At each map acquisition place, furthermore, map data covering forward area is needed. Data regarding a large scale map is obtained at a point close to a destination, so that it may cover only a limited area. As show in FIG. 1, the larger the map scale, the larger the amount of data per unit area. However, the smaller an area covered by a map is, the smaller the amount of map data is. These two effects compensate each other, so that the amount of map data does not depend greatly on the scale of a map. It is preferable in terms of not only communication capability but also setting the capacity of a memory in a vehicle for storing maps.

According to the present invention, as stated above, map data of an appropriate scale can be properly obtained in a vehicle at an appropriate point and the amount of map data to be sent does not depend greatly on map scale. Therefore, useful map data can be obtained at each point along the route to a destination, and a sufficient amount of map data can be obtained with limited communication capability and a limited amount of memory capacity in a vehicle.

(2) The present-position detecting means can be installed either in a vehicle or at the center. When installed on a vehicle, a detecting device using satellite, self-contained or radio navigation or their combination, such as a GPS device or a gyro sensor, may be preferable. When installed at the center, devices for recognizing a vehicle should be installed, perhaps, along the edges of roads. Alternatively, the vehicle and center sides can cooperatively detect a present position.

The same applies to the destination setting means. For example, a switch or an audio input device by which a user inputs his/her destination can be installed in a vehicle; means for automatically setting a destination can be installed on the center side; or both sides can cooperatively set a destination.

The above factors also apply to the deciding means for deciding whether a vehicle has reached a map acquisition place. These means may also be installed either in a vehicle or on the center side.

According to one aspect of the present invention, a map acquisition unit in a vehicle includes the deciding means, and the map acquisition unit requests the center unit to send map data when the vehicle reaches a map acquisition place. The center unit sends map data in response to the request.

According to another aspect of the present invention, the map acquisition unit includes the present-position detecting means and the deciding means is included in the center unit and decides, based on present position data sent from the map acquisition unit, whether a vehicle has reached a map acquisition place. This aspect is a system of a center-push type in which the center unit sends maps at its own discretion.

(3) A map acquisition unit according to one aspect of the present invention is a vehicle-mounted unit for obtaining from a center unit, via a communication medium, map data covering areas to the travel destination. The map acquisition unit includes present-position detecting means for detecting a present position, destination setting means for setting a travel destination, requesting means for requesting, based on the present position, the center unit to send map data when the vehicle reaches one of map acquisition places set for each scale of map data, and storing means for storing map data from the center unit. The scale of the map data corresponds to the requesting map acquisition point. Larger scale map data is obtained nearer to the destination so that the scale of a map obtained at a map acquisition point balances with the distance between this point and the destination. This aspect can achieve the same effect as that described in the above (1).

Preferably, after a vehicle has entered an area covered by map data with one scale obtained at the above map acquisition place, the previously obtained small scale map data is deleted from the storing means. It is necessary to hold map data of only one or two scales at a time, so the necessary memory capacity for holding map data can be reduced.

(4) Preferably, a map acquisition unit according to the present invention and a navigation apparatus are installed together. Especially, the following configuration is preferable.

A navigation apparatus according to one aspect of the present invention is a unit for providing route guidance using map data covering areas to a destination. This apparatus comprises a present-position detecting section for detecting a present position, a map acquisition process section for obtaining map data from the outside via a communication medium, and a guidance process section for providing route guidance using map data obtained by the map acquisition process section. As the present position nears the destination, the scale of map data the map acquisition process section obtains becomes larger in stages. The guidance process section changes map data for route guidance to larger scale map data the map acquisition process section has obtained.

In this aspect, as in the above (1), small scale map data is obtained at points distant from the destination; larger scale map data is obtained at points nearer a destination. The scale of map data used for route guidance gradually becomes larger. At a point distant from a destination, therefore, small scale map data is used for route guidance. This small scale map data may be too rough to locate the destination itself, but being able to guide a vehicle toward the destination is sufficient at that state. As the vehicle nears the destination, larger scale map data is used for route guidance. Finally, the largest scale map data is used for guidance so that the vehicle operator can locate the destination.

According to this aspect, at each point along the route to a destination, sufficient map data to plan a route is obtained. Especially, as described in (1), required map data can be provided using limited communication capability. The center does not need to route many vehicles. Naturally, the cost of required storage media, such as a CD-ROM, and related configurations can be reduced. Therefore, a low-cost navigation apparatus with a sufficient route guidance feature is obtainable.

In the above aspect, it may be preferable for the guidance process section to provide route guidance with a point on a map used for route guidance as a tentative destination toward the above destination. The map acquisition process section then decides, based on the distance between the present position and the above point, whether a vehicle has reached the boundary where map data of a scale larger than that of map data being used for route guidance should be obtained. With small scale map data, the detailed position of the destination may not be specified. However, if a tentative destination is set as described above, route guidance for guiding a vehicle toward its destination can be provided. This aspect also has the advantage of being able to significantly reduce data used for route calculation because a target for routing is limited to a tentative destination point. Limiting a target furthermore results in a easy and high-speed route calculation process.

A destination may also be set in multiple phases. As with an embodiment described below, for example, a destination can be separated according to address hierarchy (prefecture, city, street, and address). First, only the name of the prefecture is set, an arbitrary typical point is specified as the tentative destination, and route guidance for guiding a vehicle toward this tentative destination is provided. When the vehicle nears the point, the name of the city, which is the next hierarchy, is set. Setting a destination in multiple phases makes it easier for a user to input the destination, and the user can easily operate the navigation apparatus. The description above of corresponds to the Japanese address structure but users in any country can adopt hierarchies suitable for the address structure in that country. In America, for example, this could include state, county, city, town, street, and address.

DETAILED DESCRIPTION OF PREFERRED EMBODIMENTS

Figure 1:
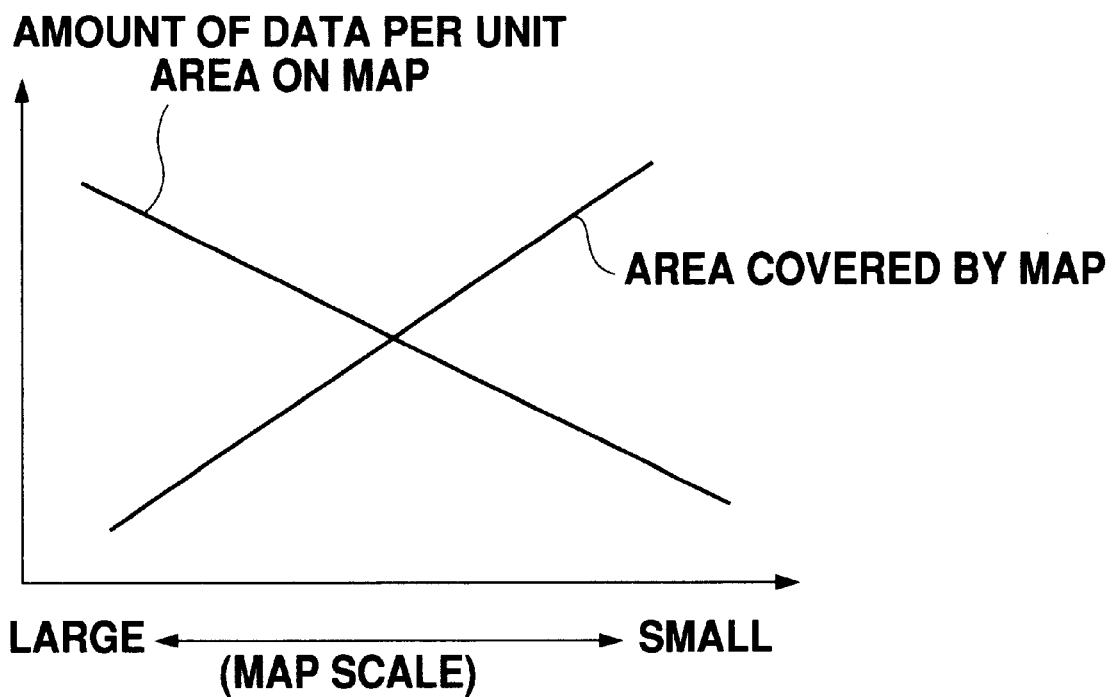
FIG. 1 is a graph showing the relationship between map scale and the amount of data per unit area and area covered.
Figure 2:
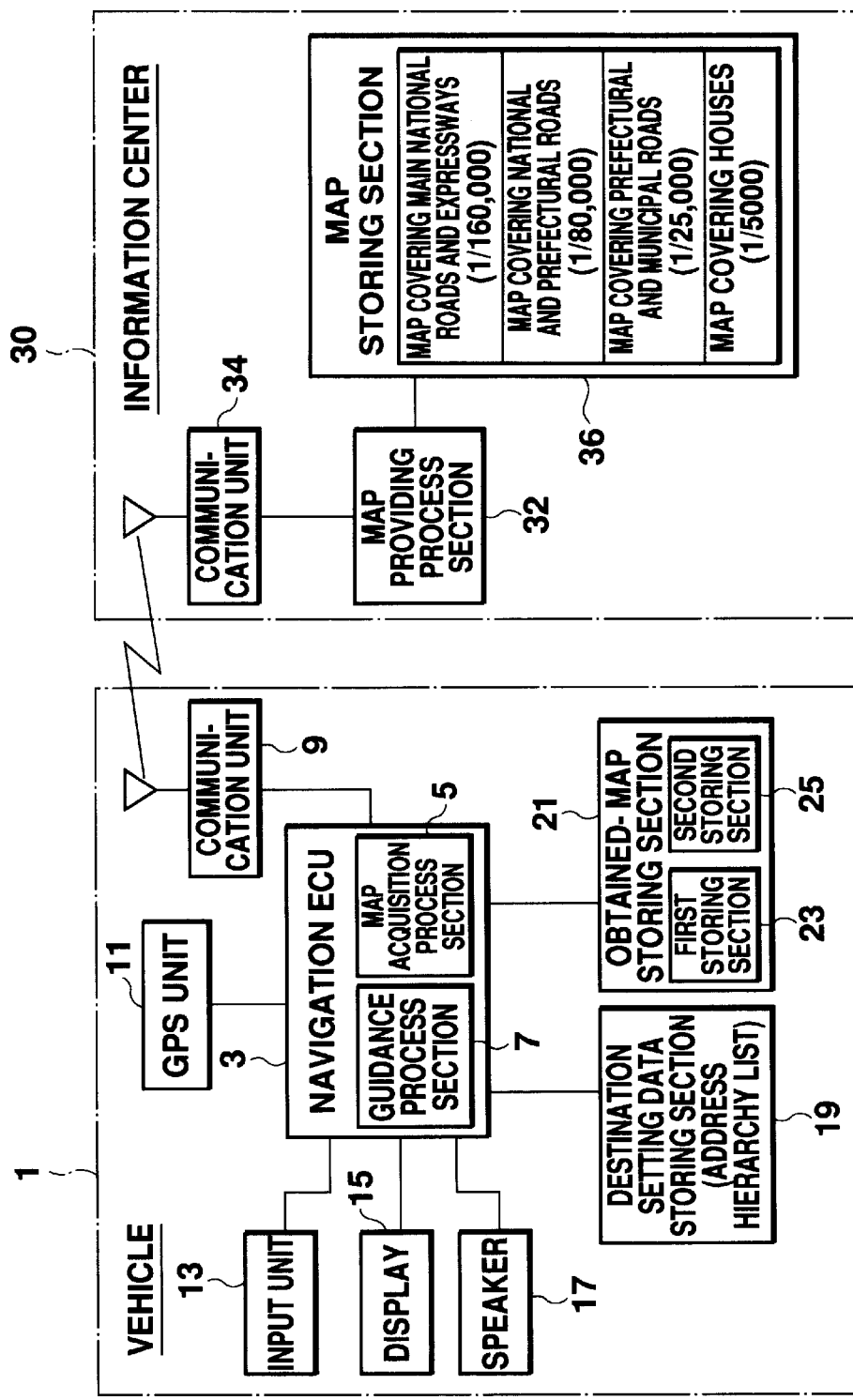
FIG. 2 is a block diagram showing a complete configuration of an embodiment according to the present invention.

By reference to the drawings, preferred embodiments of the present invention will be described below. A map acquisition system according to the first embodiment comprises an information center and a map acquisition unit in a vehicle. The map acquisition unit is unitedly configured with a vehicle-mounted navigation apparatus. The information center is part of an infrastructure and a form of a center unit according to the present invention. FIG. 2 is a block diagram showing an entire configuration of the map acquisition system.

A vehicle-mounted navigation apparatus 1 includes navigation ECU 3, which controls the entire apparatus. The navigation ECU 3 comprises a map acquisition process section 5 and a guidance process section 7. The map acquisition process section 5 obtains map data from an information center using a communication unit 9. The guidance process section 7 performs a process, such as route guidance, using map data obtained by the map acquisition process section 5.

A GPS unit 11, an input unit 13, a display 15, and a speaker 17 are connected to the navigation ECU 3. The GPS (Global Positioning System) unit 11 detects a present position using signals sent from a satellite and sends it to the navigation ECU 3. A user inputs various instructions to the navigation ECU 3 using the input unit 13. The input unit 13 may include various switches and a voice recognition unit. The display 15 as an output unit displays a map for route guidance. The display 15 also displays an image for assisting user's operation, such as that for setting a destination. The speaker 17 properly outputs voice guidance for guiding a vehicle according to a set route. Again, the speaker 17 properly outputs voice guidance requesting a user to input an instruction to a unit.

A destination setting data storing section 19 is also connected to the navigation ECU 3. The destination setting data storing section 19 stores an address list of the whole of Japan. This address list has hierarchical structure, the first hierarchy of which consists of the Prefectural names. The second hierarchy consists of the names of Districts, Cities, etc.; and the third hierarchy consists of the names of Streets, Villages, etc. A name included in each hierarchy is a form of an address element according to the present invention. (This description is based on the hierarchical structure of Japanese addresses, but the specifications of a system should be preferable to the actual circumstances of each country. In the United States, for example, values for State, County, City, Street, Road, etc. should be used.) The address list is used when a destination is set. First, the navigation ECU 3 causes a list of Prefectures to be displayed on the display 15. A user selects one Prefecture via the input unit 13. Next, a list of Cities and Districts in the selected Prefecture is displayed on the display 15. When the user selects one, a list of Streets and Villages is then displayed in turn, from which the user also selects one. The user inputs numeric values for the lowest hierarchy, such as Chome number, Lot Number, etc. Preferably, the destination setting data storing section 19 stores various facilities of the whole of Japan with their associated addresses. When a user selects one, its address is set as a destination.

An obtained-map storing section 21 is also connected to the navigation ECU 3. The obtained-map storing section 21 is a memory unit for storing map data obtained by the map acquisition process section 5 and includes a first storing section 23 and a second storing section 25. Each of the storing sections 23 and 25 has enough capacity to store obtained map data. The storing sections 23 and 25 alternately store map data obtained in sequence. In each of the storing sections 23 and 25, stored map data is deleted before or while new map data is written into it.

A configuration of an information center 30 will be described below. A map providing process section 32 controls an entire apparatus on the center side. A communication unit 34 is connected to the map providing process section 32 and the communication unit 34 is used to perform data communication between a vehicle and the center side.

A map to be provided (distributed) storing section 36 is also connected to the map providing process section 32. The map to be provided storing section 36 stores map data of the whole of Japan. As shown in FIG. 2, the map storing section 36 stores map data of four scales. Map data with the smallest scale of 1:160,000 covers information regarding main national roads and expressways. Map data with a scale of 1:80,000 covering national and prefectural roads, map data with a scale of 1:25,000 covering prefectural and municipal roads, and map data with a scale of 1:5,000 covering houses is also stored. When a request for map data is sent from a vehicle, it is accepted by the map providing process section 32. The map providing process section 32 reads out the map data specified in the request from the map storing section 36 and sends it to the vehicle using the communication unit 34.

Figure 3:
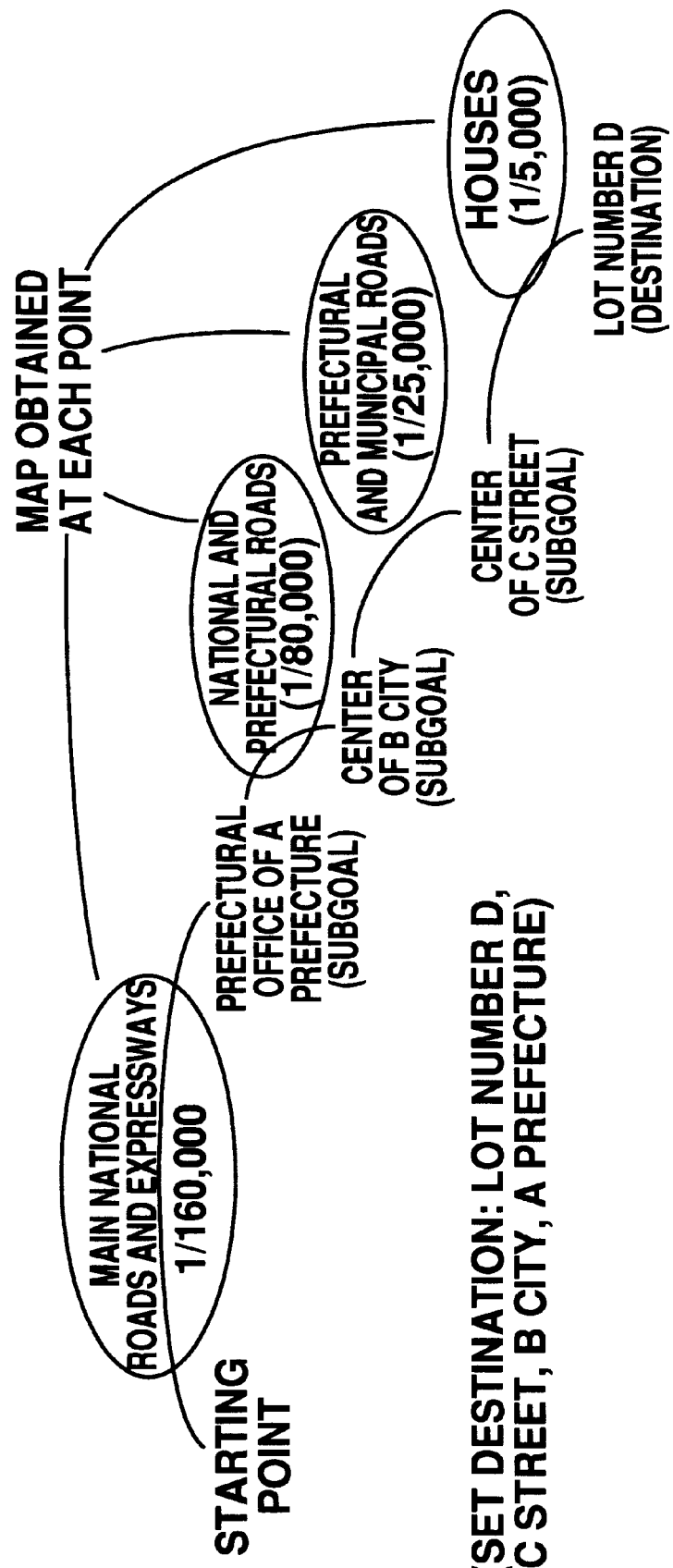
FIG. 3 shows an overview of operation of the system of FIG. 2.

Operation of the system illustrated by FIG. 2 will be described below. First, an overview of the operation will be described below by reference to FIG. 3. A starting point of route guidance is a place where a vehicle travels when its destination is input. As a vehicle approaches its destination, the scale of map data obtained by the vehicle-mounted navigation apparatus 1 becomes larger. Assuming that the address of a destination is Lot D, C Street, B City, A Prefecture. (a) First, map data with the smallest scale of 1:160,000 which enables a vehicle to reach the prefectural office of A Prefecture is obtained at its starting point. This map data is used to provide route guidance with the prefectural office of A Prefecture as a subgoal (corresponding to the tentative destination of the present invention). (b) When the vehicle reaches a point which is of a predetermined distance from the prefectural office of A Prefecture, map data with a scale of 1:80,000 (covering national and prefectural roads) which is necessary for the vehicle to reach the center of B City is obtained and route guidance with the center of B City as a subgoal is provided. (c) Similarly, when the vehicle reaches a point which is a predetermined distance from the center of B City, map data with a scale of 1:25,000 (covering prefectural and municipal roads) is obtained and route guidance with the center of C Street as a subgoal is provided. (d) When the vehicle has approached the center of C Street, map data with a scale of 1:5,000 covering the area around Lot D is obtained. This map data covering houses is used to provide route guidance to allow the vehicle operator to reach Lot Number D.

As stated above, a subgoal set when each map data is used is an arbitrary point on the map. This point is a tentative destination which a vehicle aims for while traveling towards its destination. A place where map data is obtained, that is, a place which is a predetermined distance from a subgoal, is referred to as a map acquisition place. A map acquisition place can be a particular point or an area on a route. Map data obtained at each stage includes the whole area of a target address part (Prefecture, City, etc.) at that stage, and obtained map data therefore also covers the destination.

Figure 4:
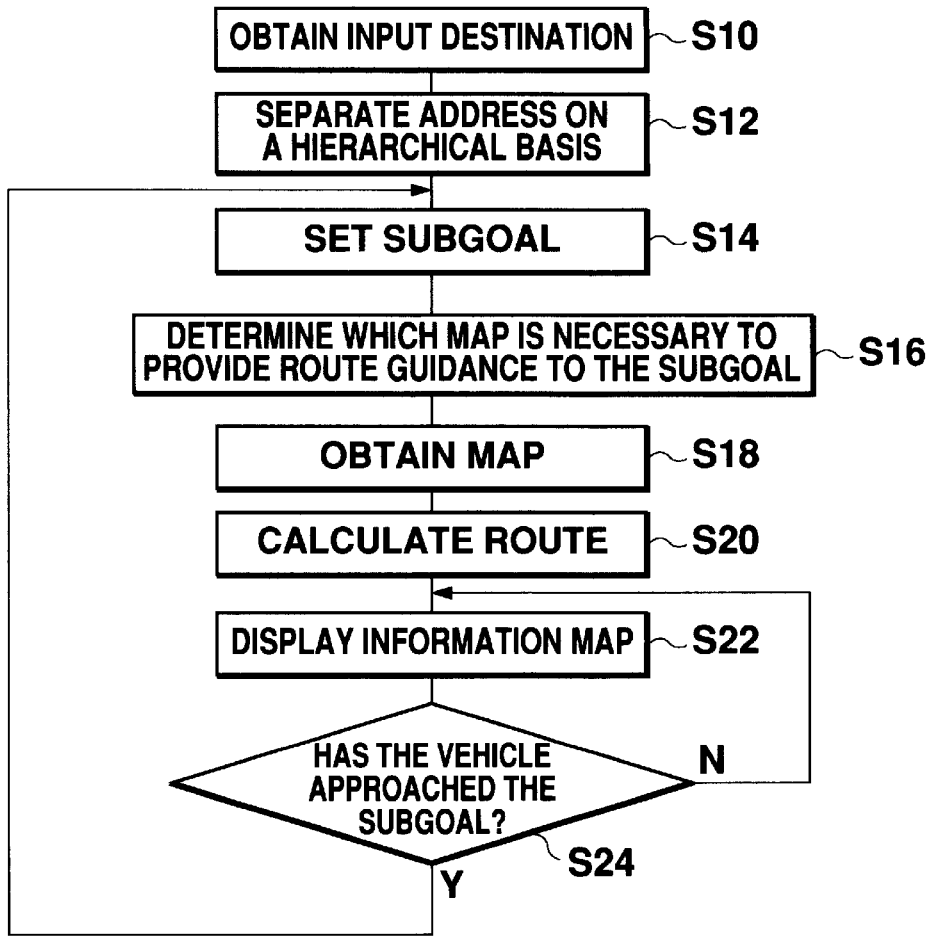
FIG. 4 is a flowchart showing operation of the system of FIG. 2.

FIG. 4 is a flowchart showing a process for map acquisition and route guidance as outlined above. This process begins with destination input by a user. As with FIG. 3, it is assumed that the address of a destination is Lot D, C Street, B City, A Prefecture. The navigation ECU 3 obtains a destination input with the input unit 13 (S10). The map acquisition process section 5 in the navigation ECU 3 separates the address of the destination on a hierarchical basis. That is, it is separated into four hierarchies, A Prefecture, B City, C Street, and Lot D (S12).

Next, the map acquisition process section 5 sets the first subgoal (S14). The first subgoal is the prefectural office of A Prefecture, the first hierarchy of the address. However, if the present position of the vehicle is already in A Prefecture, the first subgoal is the center of B City, the second hierarchy of the address. Similarly, if the vehicle is already in B City, the first subgoal is the center of C Street. If the vehicle is already in C Street, the first subgoal is Lot Number D. The subsequent process is the same for whatever hierarchy the first subgoal corresponds to. Here, an explanation is given for when the first subgoal is the prefectural office of A Prefecture (the present position is outside A Prefecture).

After the subgoal is set, the navigation ECU 3 determines which level of map data is necessary to provide route guidance to the subgoal (S16). In this embodiment, hierarchies of an address are associated with the map scale. The first hierarchy (Prefecture), the second hierarchy (District and City), the third hierarchy (Street and Village), and the fourth hierarchy (Lot Number) are associated with maps with respective scales of 1:160,000, 1:80,000, 1:25,000, and 1:5,000. Based on this association, it is determined that, if a subgoal is the prefectural office of A Prefecture, map data with a scale of 1:160,000 covering A Prefecture (prefectural office) and the present position (starting point) is necessary.

Based on the determination in S16, the map acquisition process section 5 obtains necessary map data using a communication unit 9 (S18). The map acquisition process section 5 sends the information center 30 a request specifying necessary maps. This request shows that a map with a scale of 1:160,000 covering the present position and A Prefecture is necessary. The map providing process section 32 in the information center 30 which has accepted the request reads out from the map to be provided storing section 36 the map data specified in the request and sends it to the vehicle using the communication unit 34. The map acquisition process section 5 writes into the first storing section 23 or the second storing section 25 in the obtained-map storing section 21 the map data received from the information center 30.

The guidance process section 7 uses map data obtained in S18 to search and determine the optimum route to the subgoal set in S14 (S20). The route selection maybe performed by a normal method, such as a Dijkstra method. In this case, data, such as main national roads, should be used to select a route to the prefectural office which is a typical point of A Prefecture. Therefore, a much smaller amount of data is necessary for the route search and a calculation process for the route search can be simplified.

Figure 5:
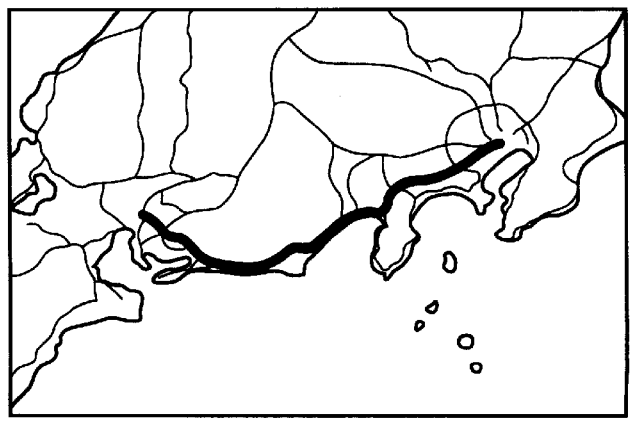
FIG. 5 shows an example of an information map display by the system of FIG. 2.

The guidance process section 7 uses the determined optimum route to provide route guidance (S22). A map with a scale of 1:160,000 obtained in S18 is displayed on the display 15. This map covers the starting point and A Prefecture and a selected route to the prefectural office of A Prefecture is displayed differently from other roads. A display example of an information map is shown in FIG. 5. The user may drive their vehicle towards A Prefecture using the information map.

Based on output of the GPS unit 11, the map acquisition process section 5 determines whether the vehicle has approached the subgoal (S24). As stated above, a map acquisition place is set at a predetermined distance from the subgoal. Before the vehicle reaches this map acquisition place, a determination in S24 is "No" and an information map in S22 is displayed.

Once the vehicle has reached the map acquisition point and a determination in S24 has become "Yes," the process returns to S14 and the next subgoal is set. In this example the next subgoal is the center of B City. The subsequent process is the same in principle as that performed when the prefectural office of A Prefecture is a subgoal. In S16, map data with a scale of 1:80,000 covering B City is determined to be necessary. This map may or may not include the map acquisition place itself. Map data not including the map acquisition place itself is obtained at an earlier stage. Once the vehicle has entered the area covered by the obtained map data, use of that map begins. In S18, the vehicle informs the information center 30 that a map with a scale of 1:80,000 covering B City is necessary, and map data is sent in response. A route calculation for reaching the center of B City (S20) and a display of an information map (S22) are performed using the map data sent. Furthermore, when the vehicle reaches the next map acquisition place; a determination in S24 becomes "Yes," the process returns to S14 and the next subgoal (center of C Street) is set. The subsequent process is the same as that described above, and so the description will not be repeated.

The fourth hierarchy of the address is Lot D and the destination itself is set as the fourth subgoal. In S18, a map with a scale of 1:5,000 covering Lot D is obtained. This map data indicates individual buildings and is used to provide route guidance so that the vehicle may reach its destination. It has been difficult, in terms of capacity, to store house map data in a conventional storage medium, such as a CD-ROM. In this embodiment, however, house map data can be used via a communication medium to provide route guidance.

Figure 6:
FIG. 6 shows an example of an information map display by the system of FIG. 2.
Figure 7:
FIG. 7 shows an example of an information map display by the system of FIG. 2.

Examples of a route information display according to this embodiment are shown in FIGS. 5 through 7. In FIG. 5, a map with the largest scale is displayed and the seat of the prefectural office in A (Aichi) Prefecture is a subgoal. In FIG. 6, a map covering B (Okazaki) City obtained after a vehicle has approached A Prefecture is displayed. And in FIG. 7, a map covering C Street obtained after the vehicle has approached the center of B City is displayed.

Figure 8:
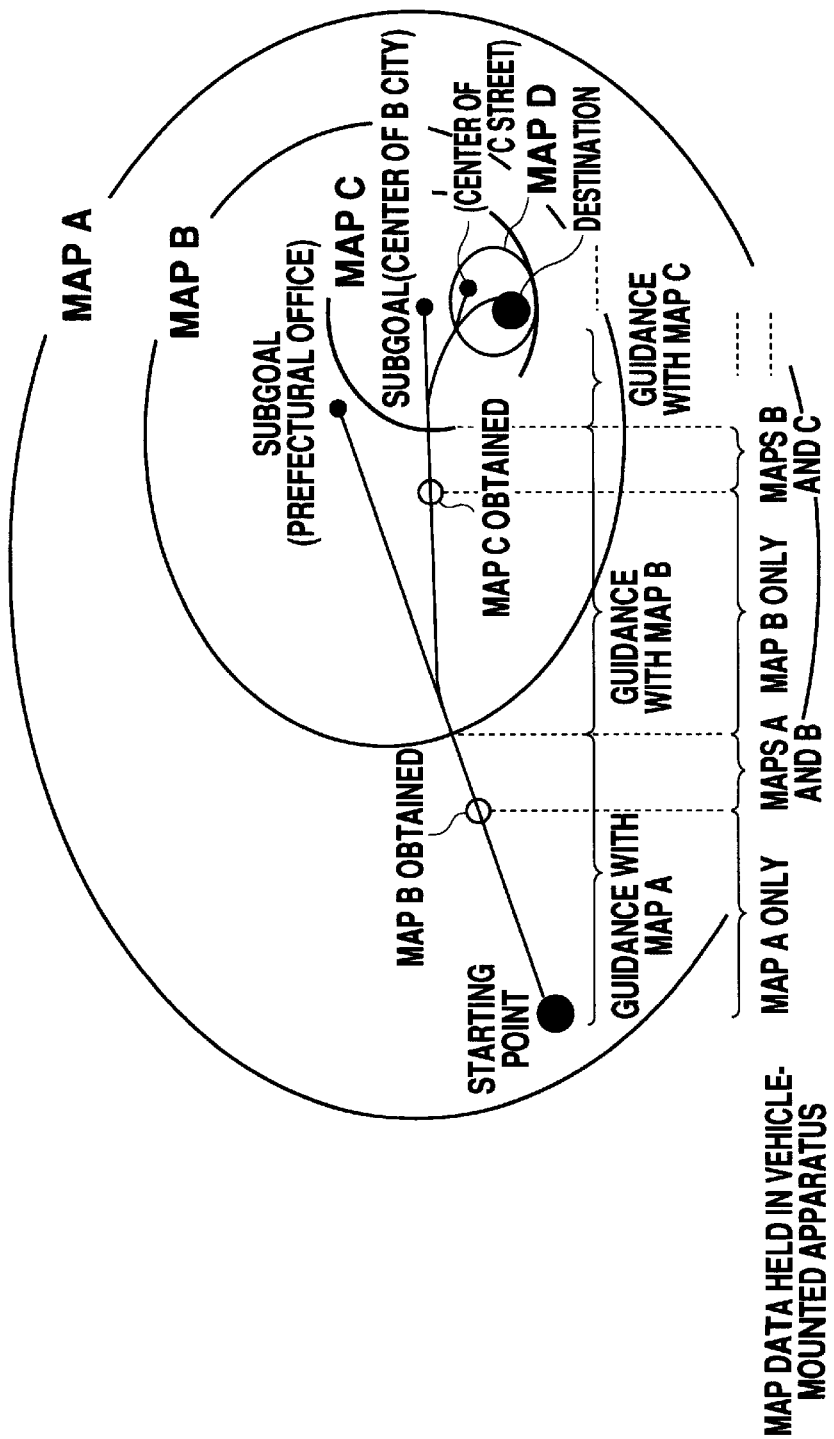
FIG. 8 shows an operational model of the system of FIG. 2.

In FIG. 8, the modeled operation of the above system is shown. At a starting point at the left end of FIG. 8, a map with a scale of 1:160,000 (map A) covering the starting point and a prefectural office, a subgoal, is obtained. This map is used to begin route guidance.

However, route guidance between the starting point and main roads covered by map A (main national roads and expressways) cannot be provided using map A. Route guidance for this part is provided as follows. The starting point is equivalent to the destination of the preceding route guidance in general. Therefore, the map data with a scale of 1:5,000 is obtained last because the preceding route guidance is held in the obtained-map storing section 21 in a vehicle. This map data is used to provide route guidance to the main roads. If it is impossible to provide route guidance to the main roads using only the map data with a scale of 1:5,000, map data with a smaller scale is obtained from an information center. This process is the same as that performed when a vehicle has approached its destination. The starting point, however, can be different from the destination of the preceding route guidance. In this case, the map data stored in the obtained-map storing section 21 cannot be used. Therefore, a new map covering the area around the starting point is obtained.

As shown in FIG. 8, route guidance with map A is provided for some time after the trip is begun. During this time, the obtained-map storing section 21 in a vehicle is holding map A. It is assumed that map A is held in the first storing section 23. If the vehicle travels toward a prefectural office, a subgoal, it will reach a place where map B (with a scale of 1:80,000) is obtained. The map acquisition process section 5 in the vehicle requests the information center to send map B and obtains the map B sent from the information center. Map B is written to the second storing section 25 in the obtained-map storing section 21. In this case, map A is held in the first storing section 23; map B is held in the second storing section 25.

As shown in FIG. 8, the area near where the vehicle obtained map B is not covered by map B. Therefore, route guidance with map A continues. When it is determined that the vehicle has actually entered the area covered by map B, the guidance process section 7 in the navigation ECU 3 changes the map used for route guidance. Map B is readout from the second storing section 25 and is used for routing and information display. As shown at the bottom of FIG. 8, when the vehicle has entered the area covered by map B, unnecessary map A is deleted from the first storing section 23. The center of B City is set as a subgoal for route guidance with map B. As shown in FIG. 8, this set route deviates from the first route and heads towards the center of B City.

As the vehicle approaches the center of B City, it will reach the next map acquisition point. The map acquisition process section 5 obtains map C covering the center of C Street. Map C is written in the first storing section 23 where map A was stored. Similarly, when the vehicle approaches the center of C Street, map D (with a scale of 1:5,000) is obtained and is written in the second storing section 25. Route guidance will be provided until the vehicle reaches its destination.

In this embodiment, as stated above, as a vehicle approaches its destination, map data with a larger scale is properly obtained. A large number of maps need not be obtained at once, yet sufficient map data can be obtained, even with limited communication capability. As only the map data necessary at each point is held in a vehicle, a large-capacity memory need not be installed in a vehicle. Furthermore, map data can be obtained piece by piece in parts, and appropriate routing and information display can still be performed in the vehicle.

Various modifications of this embodiment will next be described.

(1) The map acquisition system can be modified into a configuration of a center-push type. For example, the navigation ECU 3 in the vehicle-mounted navigation apparatus 1 first sends, at a starting point, the information center 30 a present position and a destination and later sends a present position at any time. The map providing process section 32 in the information center 30 monitors the present position of a vehicle and determines whether the vehicle has reached a map acquisition point. When the vehicle reaches a map acquisition point, the map providing process section 32 reads out suitable map data from the map to be provided (distributed) storing section 36 and sends this data to the vehicle. The navigation ECU 3 uses the obtained map data to provide route guidance. In this modification, the same advantages as described above are still achieved.

Figure 9:
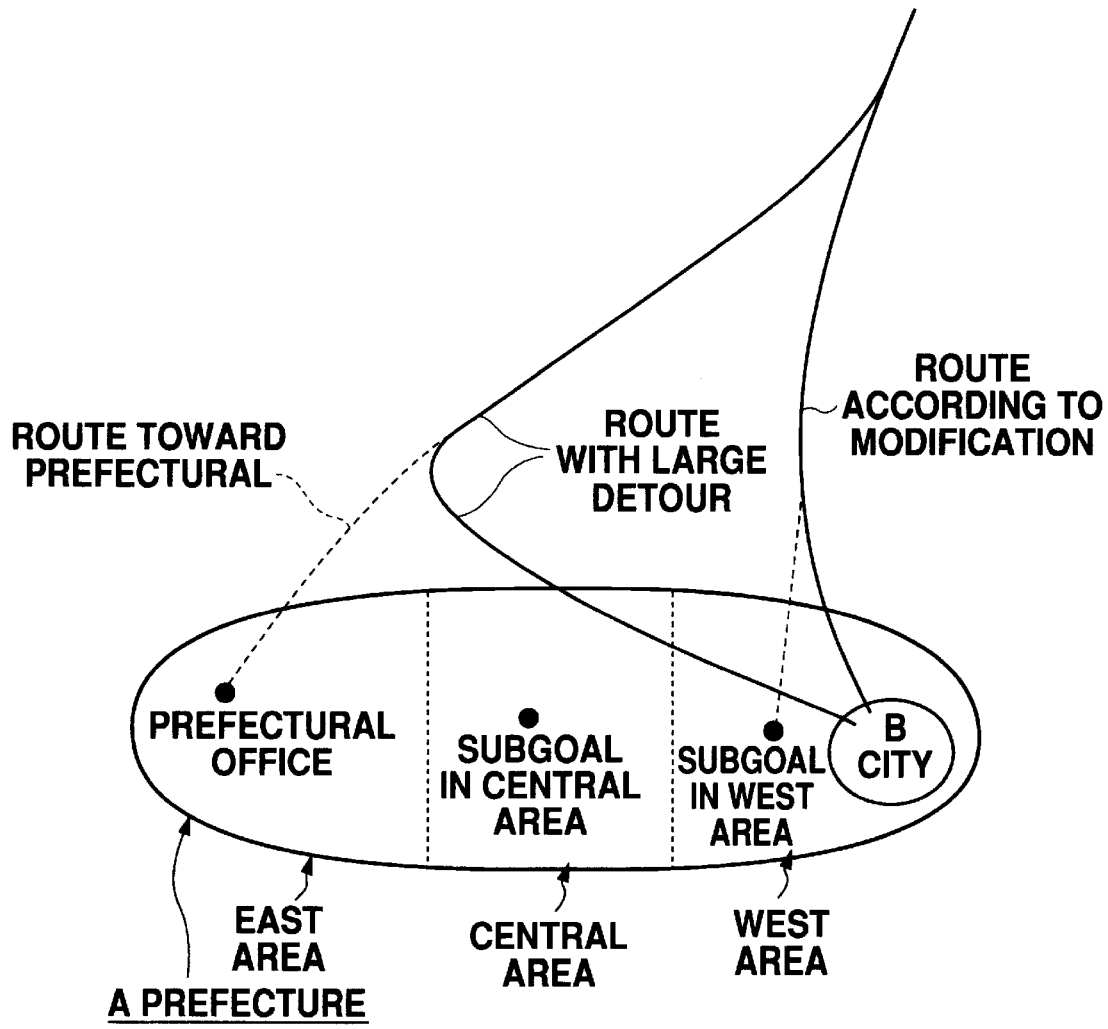
FIG. 9 is a view showing the division of a map for a modification of the embodiment.

(2) In this embodiment, a subgoal is set based on each hierarchy of an address. A subgoal for the first hierarchy may be a prefectural office, while a subgoal for the second hierarchy may be the center of a City or District. As can be seen from FIG. 9, however, if there is a great distance between the seat of the prefectural office in A Prefecture and the center of B City, setting the prefectural office as a subgoal will result in a large detour. In consideration of situations such as this, where the route to a subgoal for a hierarchy is badly affected by a subgoal for a higher hierarchy, it is preferable that the following configuration should be taken. In this modification, a more detailed classification than that based on address hierarchy is used. In an example of FIG. 9, A Prefecture is divided into three areas: east, central, and west, and a subgoal in each area is predetermined. An area to which B City, the second hierarchy, belongs is determined. And then a subgoal in the area to which B City belongs is set as a subgoal for the first hierarchy.

Figure 10:
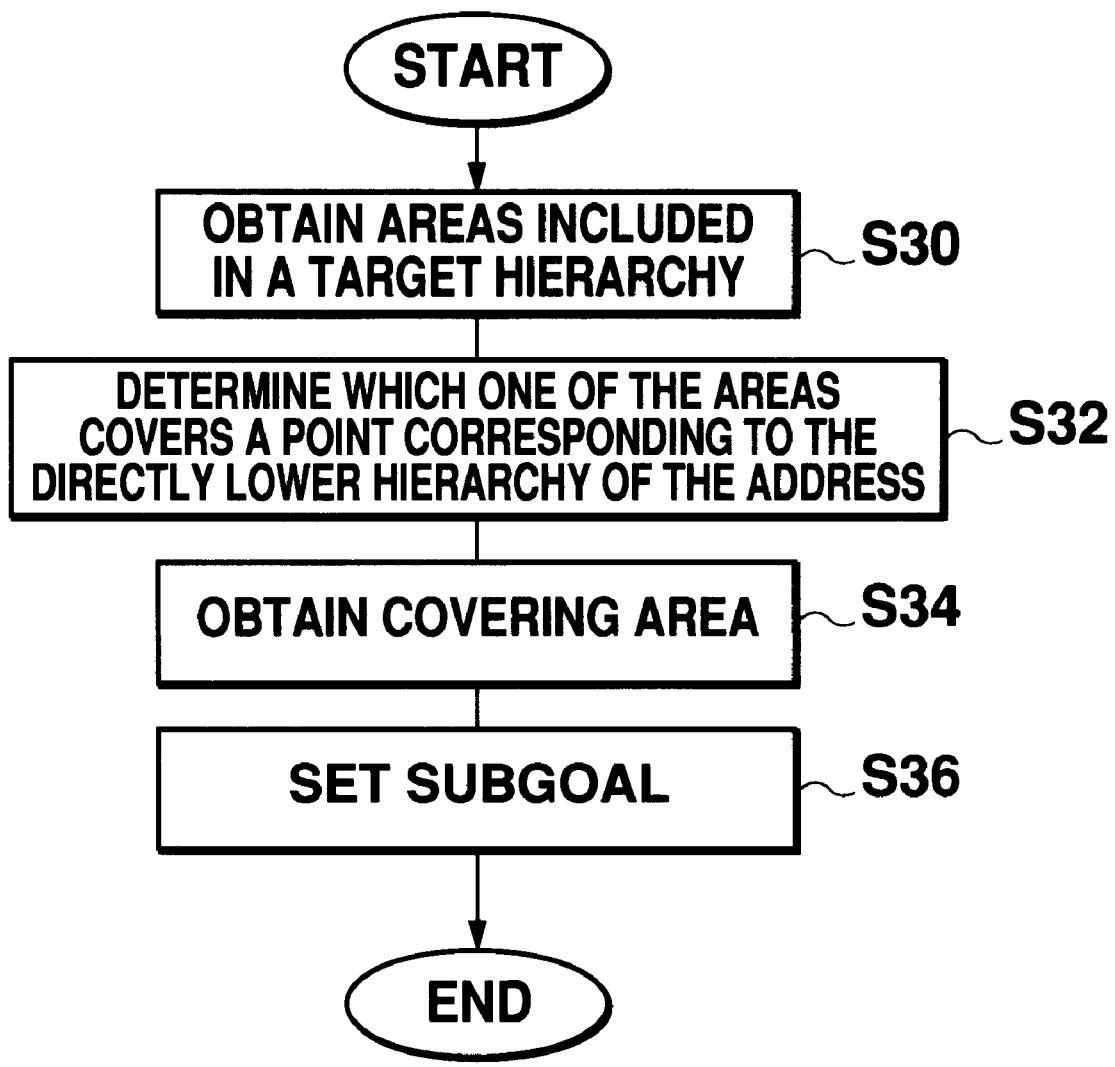
FIG. 10 is a flowchart of a subgoal setting process of the modification of FIG. 9.

FIG. 10 is a subflowchart showing a process performed when this modification is applied to setting a subgoal in S14 of FIG. 4. First, areas included in a target hierarchy (for example, Prefecture) are obtained (S30). Next, which one of the areas obtained in S30 covers a point (City) corresponding to the directly lower hierarchy of an address is determined (S32). The covering area determined in S32 is obtained (S34) and a typical point in the covering area is set as a subgoal (S36).

It will also be preferable that in consideration of the geography of a Prefecture and the position of a prefectural office within the Prefecture, this modification should be applied only to areas of the Prefecture where it is necessary. Alternatively, application of this modification may depend on the relationship between a vehicle's present position and the Prefecture. Furthermore, this modification can be applied to setting a subgoal not only for the first hierarchy (Prefecture), as in the above example, but also for other hierarchies (City and Street).

(3) In the first embodiment, it is possible for a vehicle to approach a subgoal for a lower hierarchy before approaching a subgoal for an upper hierarchy. For example, this could happen along a coast line where a map is irregularly divided. In such a case, the acquisition of map data with a scale corresponding to the higher hierarchy can be omitted. That is, when a vehicle has reached a map acquisition point for the lower hierarchy earlier than that for the higher hierarchy, the acquisition of map data for the higher hierarchy is skipped and map data with a scale corresponding to the lower hierarchy is immediately obtained.

(4) In a further modification, a user may input his or her destination in parts. At a starting point, the navigation ECU 3 displays on the display 15 an image requesting a user to input only the name of the Prefecture. Voice guidance for requesting input is also output from the speaker 17. In response to the request, the user inputs the name of the Prefecture using manual or voice input. If the user inputs "A Prefecture," then the prefectural office of A Prefecture is set as the first subgoal and the process of S16–S24 of FIG. 4 is performed.

When the vehicle approaches A Prefecture and reaches a map acquisition point, the user is requested to input the name of a City or District, the next hierarchy of an address. This is also requested by the display 15 and the speaker 17. If the user inputs "B City;" then the center of B City is set as a subgoal, map data is obtained, and route guidance is provided. The same procedure is applied to the remaining lower hierarchies. That is, after the vehicle reaches a map acquisition place, an instruction and input for setting the next subgoal is performed.

This modification can reduce the number of procedures performed by a user in order to set his/her destination. That is, the bother of setting a destination through many input stages at a time is eliminated and a user, is able to operate a navigation apparatus more easily. Furthermore, oral input by a user is limited. The first input, for example, is limited to the name of the Prefecture. Input in voice by the user at the next map acquisition place is limited to the name of a City or District belonging to the higher hierarchy. Input words and vocabularies (place names) to be matched with them are limited in a matching process of voice input, so the accuracy of voice recognition is increased.

(5) In the description of the first embodiment, a subgoal was set to be a prefectural office or the center of a City. However, subgoals, are of course not limited to these definitions and may be any arbitrary point in a certain area. A subgoal may, for example, be an expressway interchange and it is in fact preferable if routing is performed by preferentially selecting an expressway.

Map data is usually separated into many square sections. The central point of this square section may be set as a subgoal. Alternatively, one (preferably, the nearest one to the present position of a vehicle at the time of map acquisition) of the four vertices of this square section may be set as a subgoal.

(6) In the above description, the vehicle-mounted navigation apparatus 1 obtains from the information center 30 map data of all four scales. However, the present invention can also be applied only to map data of some scales. In this case, map data with the other scales is prepared in a vehicle. For example, a map storing unit having a storage medium, such as a CD-ROM, is included in the vehicle-mounted navigation apparatus 1. This storage medium stores small scale (for example, 1:160,000) map data. The navigation ECU 3 reads out and uses from the storage medium the small scale map data. Map data with a larger scale (1:80,000, 1:25,000, and 1:5,000) than that of map data stored in the storage medium is obtained from the information center 30. A map storing medium in a vehicle may also store map data with two or more scales.

(7) In the above description, map data to be sent includes data for map display and for route calculation. In contrast, it is possible that only data for map display is obtained from an information center, and that data for routing is previously prepared in a vehicle.

(8) While in the above description, route calculation is performed in a vehicle so that there is no need to perform route calculation in an information center, and the burden on the center side was reduced, the present invention is not limited to such a configuration. If the center has sufficient data processing capability, the information center may perform route calculation. Calculation results, together with a map, would then be sent to a vehicle.

What is claimed is:

1. A map acquisition system including, connected via a communication medium, a center unit and a map acquisition unit in a vehicle for obtaining from the center unit map data covering areas to a travel destination, the system comprising:

center-side map storage means installed in the center unit and storing map data with different scales;

present-position detecting means for detecting the present position of the vehicle;

destination setting means for setting the travel destination of the vehicle; and deciding means for deciding, based on a detected present position, whether the vehicle has reached a map acquisition point individually set for said map data of each scale, wherein a map acquisition point where larger scale map data is obtained is set nearer to the destination so that the scale of map data obtained at a map acquisition point balances with the distance between this point and the destination, and the center unit sends, based on a decision of said deciding means, the map acquisition unit map data with a scale corresponding to a map acquisition point where the vehicle has reached, wherein said present-position detecting means is included in the map acquisition unit and said deciding means is included in the center unit and decides, based on present position data sent from the map acquisition unit, whether a vehicle has reached the map acquisition point.

2. A navigation apparatus for providing route guidance using map data covering areas to a destination, comprising:

a present-position detecting section for detecting a present position;

a map acquisition process section for obtaining map data from an outside source via a communication medium; and a guidance process section for providing route guidance using map data obtained by the map acquisition process section, wherein as the present position nears the destination, the scale of map data obtained by the map acquisition process section becomes larger, the guidance process section changes map data for route guidance to the larger scale map data which the map acquisition process section has obtained and provides route guidance using a tentative destination in the rough vicinity of said destination, said tentative destination being a predetermined typical point on a currently used route guidance map, and the map acquisition process section decides, based on the distance between the present position and said tentative destination, whether a vehicle has reached a point where larger scale map data than the map data then being used for route guidance should be obtained.

3. A navigation apparatus for providing route guidance using map data covering areas to a destination, comprising:

a present-position detecting section for detecting a present position;

a map acquisition process section for obtaining map data from an outside source via a communication medium; and a guidance process section for providing route guidance using map data obtained by the map acquisition process section;

address separating means for separating a destination address with hierarchical structure into address elements belonging to individual hierarchies, wherein, as the present position nears the destination, the scale of map data obtained by the map acquisition process section becomes larger, and the map acquisition process section obtains in turn a map corresponding to an address element belonging to a lower hierarchy, and wherein a map scale is set for each hierarchy of address elements so that a lower address element corresponds to a larger scale, wherein the guidance process section changes map data for route guidance to the larger scale map data which the map acquisition section has obtained and provides route guidance using a tentative destination in the rough vicinity of said destination, said tentative destination being a predetermined typical point on a currently used route guidance map, and when the present position nears the current tentative destination, the map acquisition process section obtains a map corresponding to an address element of the next lower hierarchy and usable for guidance to a tentative destination for said address element of the next lower hierarchy.

4. A navigation apparatus according to claim 3, wherein, after a map corresponding to an address element of the lowest possible hierarchy is obtained, said guidance process section uses the map to provide route guidance to the actual destination.

\* \* \* \* \*

UNITED STATES PATENT AND TRADEMARK OFFICE
CERTIFICATE OF CORRECTION

PATENT NO.   : 6,061,003
DATED        : May 9, 2000
INVENTOR(S)  : Tomoyasu HARADA It is certified that error appears in the above-indentified patent and that said Letters Patent is hereby corrected as shown below:

On front cover of patent, Foreign Application Priority Data, line 1, change "Jul. 27" to --Jul. 17--.

Signed and Sealed this

Third Day of April, 2001

Attest:

NICHOLAS P. GODICI

Attesting Officer          Acting Director of the United States Patent and Trademark Office